United States Patent [19]
Olander et al.

[11] 3,896,359
[45] July 22, 1975

[54] MULTISPEED CONTROL SYSTEM

[75] Inventors: Charles C. Olander, Huntington Beach; Michael J. Caparone, Arcadia, both of Calif.

[73] Assignee: Robertshaw Control Company, Richmond, Va.

[22] Filed: Jan. 19, 1973

[21] Appl. No.: 325,182

[52] U.S. Cl. .................. 318/334; 318/471; 318/473
[51] Int. Cl. ............................................. H02p 7/58
[58] Field of Search ............ 318/334, 471, 473, 345

[56] References Cited
UNITED STATES PATENTS

| | | | |
|---|---|---|---|
| 3,057,557 | 10/1962 | Guyton | 318/334 |
| 3,329,869 | 7/1967 | Obenhaus | 318/473 |
| 3,395,459 | 8/1968 | Taylor | 318/471 |
| 3,454,078 | 7/1969 | Elwart | 318/334 |
| 3,525,916 | 8/1970 | Chodash | 318/471 |
| 3,684,940 | 8/1972 | Lutz | 318/345 |

*Primary Examiner*—B. Dobeck
*Attorney, Agent, or Firm*—Fulwider, Patton, Rieber, Lee & Utecht

[57] ABSTRACT

A multispeed control system for controlling the speed of a multispeed furnace blower fan or the like and including a temperature responsive resistor disposed in the plenum chamber of the furnace and incorporated in a bridge controlling current to the first stage of a control circuit including first and second stages. The first and second stages each include respective first and second transistor means and the temperature responsive resistor in responsive to a first temperature level to impose a first current level on the base of the first transistor means of the first stage and is responsive to a second temperature level to impose a second magnitude of current on the first transistor means of the second stage. The respective second transistor means are connected with the respective first transistor means and are responsive to the current developed in such first transistor means in response to the respective first and second current levels to develop respective electrical signals. First and second control devices are connected with the multispeed fan and with the respective second transistor means of the respective second stages and are responsive to the respective electrical signals from the respective second transistor means to render the fan operative at respective low and high speeds.

1 Claim, 1 Drawing Figure

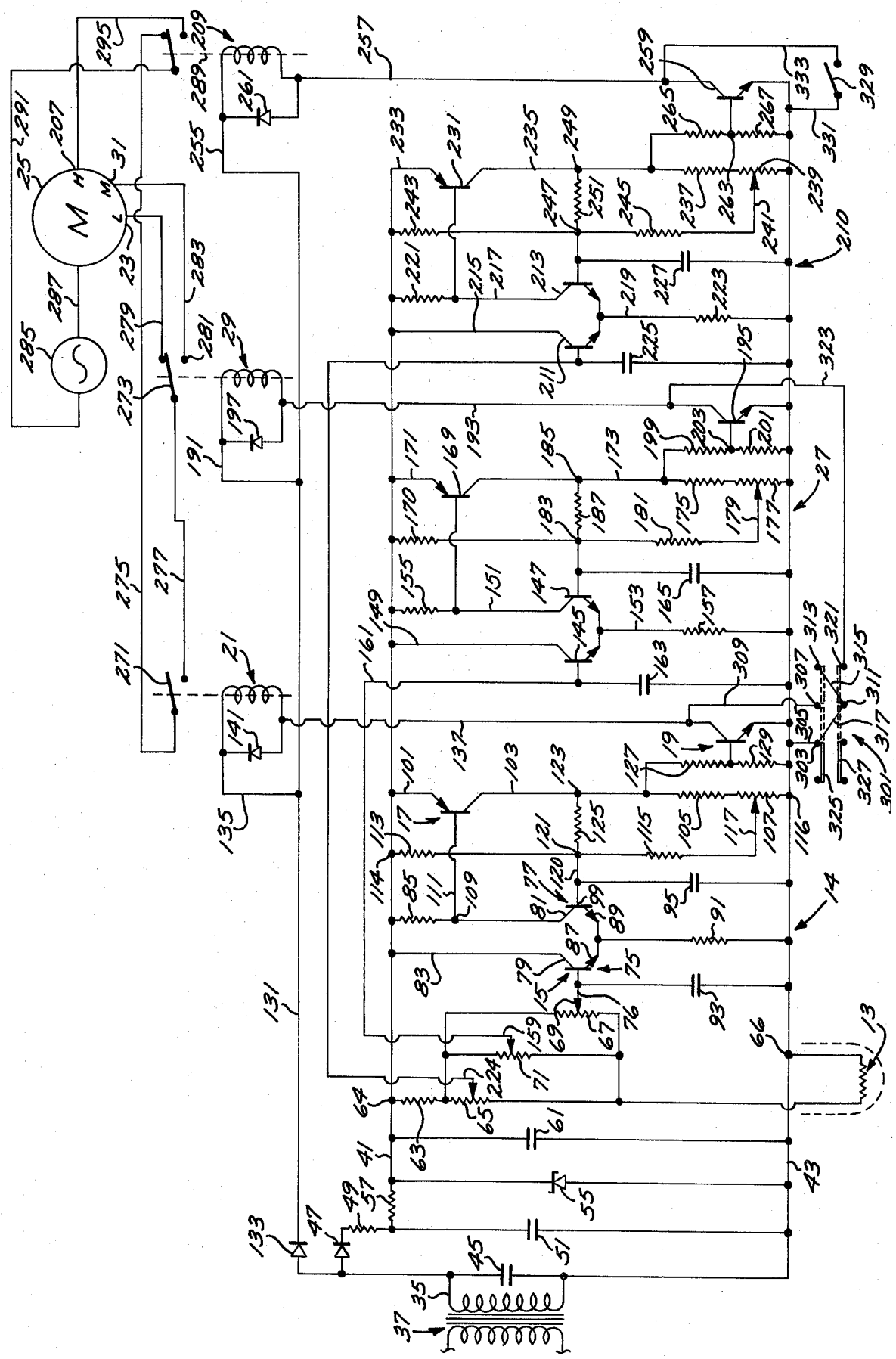

MULTISPEED CONTROL SYSTEM

BACKGROUND OF THE INVENTION

1. Field of the Invention:

The multispeed control system of the present invention relates to a system which is responsive to different magnitudes of a parameter to operate a controlled device at different speeds.

2. Description of the Prior Art:

Numerous systems have been proposed which provide for controlling furnace blowers and the like at different speeds in response to different temperature levels. Applicants are aware of the following patents disclosing systems of this type: Nos. 2,586,992, 2,223,295, 2,240,003, 2,402,177, 2,482,739 and 3,369,751.

SUMMARY OF THE INVENTION

The multispeed control system of the present invention is characterized by a sensor which is responsive to a plurality of different discrete magnitudes of a parameter, such selected magnitude producing different electrical signals which are imposed on respective first transistor means of a plurality of stages of a control circuit to selectively render such first transistor means conductive and to correspondingly render second transistor means conductive. Respective drive means are connected with the second transistor means of the respective stages and are responsive to the level of current conduction in the respective second transistor means produced in response to the first transistor means being rendered conductive to selectively render a controlled device operative at different speeds depending on the magnitude of the parameter sensed.

The objects and advantages of the present invention will become apparent from a consideration of the following detailed description when taken in conjunction with the accompanying drawing.

DESCRIPTION OF THE DRAWING

The single FIGURE in the drawing is a schematic diagram of a multispeed control system embodying the present invention.

DESCRIPTION OF THE PREFERRED EMBODIMENT

The multispeed control system of the present invention includes, generally, a temperature responsive resistor 13 connected with a first stage control circuit 14 including a transistor pair 15 which controls current to the base of an amplifying transistor 17. The amplifying transistor 17 is connected with an output transistor 19 which controls current to a relay, generally designated 21, which is operative to complete a circuit to a low speed terminal 23 of a multispeed fan motor 25. A second stage control circuit, generally designated 27, similar to that just described, is connected with the sensor 13 by means of a lead 24 and is operative to control current to a medium speed terminal 31 of such multispeed motor 25 in response to such sensor sensing a temperature higher than that required to trigger the first stage circuit 14. Thus, the resistor 13 may be placed in the plenum chamber of a forced air furnace and the motor 25 utilized to drive air over the heating units of such furnace and when such plenum chamber is heated to a first temperature, the first relay 21 will be closed to drive the fan motor 25 at a low speed and when the plenum chamber is heated to a higher temperature, the relay 29 will be actuated to drive the motor 25 at a higher speed.

The differential pair 15 and amplifying transistor 17 are connected across the secondary coil 35 of a 24 volt alternating current transformer, generally designated 37, by means of positive and negative leads 41 and 43, respectively. Connected across the secondary coil 35 is a filtering capacitor 45 and connected in the positive lead 41 is a rectifying diode 47. A voltage drop resistor 49 is connected in series with the diode 47 and a second filtering capacitor 51 is connected between the leads 41 and 43 and in series with the resistor 49. A voltage limiting zenor diode 55 is connected between the leads 41 and 43 for limiting the voltage and providing a voltage reference applied to the control circuit and a resistor 57 is included in the lead 41 for limiting the voltage applied to such zenor diode diodes 47 and 55 together with capacitor 51 effectively forming a power supply circuit.

A third filtering capacitor 61 is connected between the leads 41 and 43.

A bridge or essentially a voltage divider branch of a divider circuit includes a first leg incorporating the resistor 13, a voltage limiting resistor 63 and a third stage adjustment potentiometer 65 which is connected between nodes 64 and 66 in the respective leads 41 and 43. Connected in parallel with the potentiometer is a first stage adjustment potentiometer 67 which has its wiper 69 connected with the differential pair 15. A second stage potentiometer 71 is also connected in parallel with the third stage potentiometer 65. The respective parallel settings of potentiometers 65, 67 and 71 result in three discrete reference signals.

The differential pair 15 includes a first transistor 75 having its base 76 connected with the potentiometer wiper 69 and a second transistor 77. The respective collectors 79 and 81 of the transistors 75 and 77 are connected with the lead 41 by means of a lead 83 and a voltage drop resistor 85. The respective emitters 87 and 89 of transistors 75 and 77 are connected together and are connected to the lead 43 by means of a resistor 91. Noise filtering capacitors 93 and 95 are connected between the bases 76 and 99 of the respective transistors 75 and 77 and the lead 43.

The emitter-collector circuit of the amplifying transistor 17 is connected between the leads 41 and 43 by means of leads 101 and 103, the lead 103 including a voltage drop resistor 105 and an adjustment potentiometer 107. The base of the amplifying transistor 17 is connected with a node 109 intermediate the resistor 85 and collector 81 of the transistor 77 by means of a lead 111.

A first bridge leg includes resistors 113 and 115 and is connected between the lead 41 and the wiper 117 of the potentiometer 107 and is connected with the base 99 of the second differential transistor 77 by means of a lead 120 leading from a node 121. The base of the second transistor 77 of the transistor pair 15 is connected to a node 123 intermediate the collector of the amplifying transistor 17 and the potentiometer 107 by means of a positive feed back resistor 125.

For purposes which will be made apparent hereinafter, a pair of voltage divider resistors 127 and 129 are connected across the resistor 105 and potentiometer 107.

Connected to the top end of the secondary transformer coil 35 and in parallel with the positive lead 41 is a power circuit lead 131 including a rectifying diode 133. The low speed relay 21 is connected between the lead 131 and the lead 43 by means of leads 135, 137 and the collector-emitter circuit of the driver transistor 19. A free wheeling diode 141 is connected across the coil of the low speed relay 21 to prevent back emf and clamp such relay full on.

The second stage control circuit 27 includes a differential pair of transistors 145 and 147 connected together in a manner similar to the pair 15 and connected between the positive and negative leads 41 and 43 by means of respective collector leads 149 and 151 and a common emitter lead 153. The collector lead 151 includes a relatively low resistance resistor 155 and the lead 153 includes a current limiting resistor 157. The base of the transistor 145 is connected with the wiper 159 of the second stage potentiometer 71 by means of a lead 161. The bases of the respective transistors 145 and 147 are both connected with the negative lead 43 through respective noise filtering capacitors 163 and 165.

An amplifying transistor 169 has its collectoremitter circuit connected between the leads 41 and 43 by means of leads 171 and 173, the lead 173 including a voltage divider resistor 175 and an adjustable potentiometer 177. The wiper 179 of such potentiometer is connected with the lead 41 by means of a bridge leg including relatively high resistance resistors 180 and 182, the juncture 183 between such resistors being connected with the base of the second transistor 147 of the differential pair and also with a node 185 in the lead 173 by means of a feed back resistor 187.

The intermediate speed relay 29 is also connected between the lead 131 and lead 43 by means of leads 191 and 193 and a driver transistor 195. A free wheeling diode 197 is also connected across the coil of such relay 29. Connected across the resistor 175 and potentiometer 177 is a pair of voltage divider resistors 199 and 201 which have the juncture 203 therebetween connected with the base of such driver transistor 195.

In the particular system shown in the preferred embodiment, the fan motor 25 has a high speed terminal 207 which has current thereto controlled by means of a high speed relay, generally designated 209, and current to such relay is controlled by a third stage circuit, generally designated 210, including a third differential pair of transistors 211 and 213 connected between the leads 41 and 43 by means of respective collector leads 215 and 217 and a common emitter lead 219. Again, the leads 217 and 219 include respective resistors 221 and 223. The bases of the transistors 211 and 213 are connected with the lead 43 through noise filtering capacitors 225 and 227. A third stage amplifier transistor 231 is connected between the leads 41 and 43 by means of leads 233 and 235, the lead 235 including a voltage divider resistor 237 and a potentiometer 239. The wiper 241 of the potentiometer 239 is connected with the lead 41 by means of a bridge leg including voltage divider resistors 243 and 245, the juncture 247 between such resistors being connected with the base of the transistor 213 with a node 249 in the lead 235 by means of a feedback resistor 251.

The third stage or high speed relay 209 is connected between the lead 131 and lead 43 by means of leads 255, 257 and third stage driver transistor 259. A free wheeling diode 261 is also connected across the coil of such relay 209. The base of the third stage driver transistor 259 is connected with a juncture 263 formed between voltage divider resistors 265 and 267 connected across the resistor 237 and potentiometer 239.

The switches 271 and 273 of the first and second stage relays 21 and 29 are connected in series by means of leads 275, 277 and 279, the switch 271 being normally open and the switch 273 being normally in contact with the low speed lead 279. The normally open terminal 281 of the second stage switch 273 is connected with the medium speed terminal 31 of the motor 25 by means of a lead 283.

The common terminal of the motor 25 is connected with a power source 285 by means of a lead 287 and the opposite side of such power source is connected with the common terminal of the switch 289 of the third stage relay 209 by means of a lead 291. The normally open terminal of such switch 289 is connected with the high speed terminal 207 by means of a lead 295 and the normally closed terminal being connected with the lead 275.

A manual switch, generally designated 301, is provided for controlling the motor 25 independent of the automatic control system and includes a first terminal 303 connected with the lead 43 by means of a lead 305 and a second terminal 307 connected with the first stage relay 21 by means of a lead 309 and the lead 137. The switch 301 includes third and fourth terminals 311 and 313 connected together by means of a lead 315 and with the lead 43 by means of a lead 317 and the lead 305. A fifth lead 321 is connected with the second stage relay 29 by means of a lead 323 and the lead 193. The switch 301 includes electrically conductive sliders 325 and 327 for selective positioning to actuate the relays 21 and 29.

A third stage manual control switch 329 is connected across the third stage driver transistor 259 by means of leads 331 and 333.

In operation, the multispeed control system of the present invention may be utilized to energize various selected windings of a motor and thereby control the speed of a motor 25 driving a fan which blows air through a plenum chamber of a forced air furnace to increase the speed of such fan in proportion to increased air temperature in such plenum chamber. In such an installation, the temperature responsive resistor 13 is preferably a negative temperature coefficient thermistor and is disposed in such plenum chamber. The transformer 37 is connected with an AC power source and the manual control switches 301 and 329 are mounted in the room of which the temperature is being controlled for convenient access by the occupants.

Alternating current from the secondary coil 35 of the transistor 37 is rectified by means of the diodes 47 and 133 to provide pulsating DC current in the leads 131 and 41. Such pulsating current will be smoothed by the capacitors 51 and 61 to provide relatively smooth DC at the juncture 64. As long as the temperature of the thermistor 13 remains below the temperature at which the motor 25 is to be energized, the current from the juncture 64 will be divided between the leg of the bridge formed by the resistors 63, 65 and the thermistor 13 and the leg formed by the resistors 113, 115 and portion of the potentiometer 107 below the wiper 117 to thus maintain current flow to such legs relatively balanced. However, when the temperature in the plenum chamber is raised above approximately 120°F. the resistance of the thermistor 13 is reduced sufficiently to increase the current flow therethrough and through the resistor 63 and potentiometer 67 sufficiently to develop sufficient voltage drop from the node 64 through the resistor 63 and potentiometer 67 to the base of the first transistor 75 of the differential pair 15 to render the transistor 75 less conductive thus lowering the voltage of the emitter 87 thereof. Lowering of the voltage at the emitter of transistor 75 also serves to lower the voltage at the emitter 89 of the transistor 77. Since the bias on the base 99 of the transistor 77 remains substantially the same, and the voltage drop from the collector to emitter is increased, the collector to emitter current will be increased thus increasing the voltage drop across the triggering resistor 85. The voltage drop across resistor 85 is imposed on the emitter base of the amplifying transistor 17 thus rendering such transistor more conductive to turn such transistor full on. It will be appreciated that increased current flow through the amplifying transistor 17 increases current flow through the resistor 105 and potentiometer 107 thus increasing the voltage drop thereacross and raising the voltage at the node 123 thus increasing the voltage on the base 99 of the differential transistor 77 thus turning such transistor full on to lock the amplifying transistor 17 in its on state. It will be appreciated that this feature provides a hysteresis effect which causes the transistor to turn off at a higher emitter voltage than that which caused it to turn on thus causing the motor 25 to turn off at a lower plenum chamber than that which caused it to turn on.

Further, the increased voltage drop across the resistor 105 and potentiometer 107 raises the voltage on the base of the driver transistor 19 thus rendering such transistor conductive and providing a closed circuit from the lead 133 through the coil of the low speed relay 21 to the lead 43 thus closing the first stage switch 271 to energize the low speed terminal 23. It will be appreciated that the temperature at which the driver transistor 19 is rendered conductive may be adjusted by adjusting the first stage potentiometer 67.

If the temperature in the plenum chamber continues to increase, the resistance of the thermistor 13 will be further reduced thus increasing current flow through the bridge leg formed by the resistor 63, parallel connected potentiometers 65, 71 and 67 and such thermistor to thus increase the voltage drop across such resistor 63 and resistor 71 thus decreasing the voltage on the wiper 159 and consequently the voltage on the base of the second stage differential pair transistor 145 to thereby reduce the rate of collector to emitter current therethrough. Consequently, the voltage on the emitter of transistor 145 is reduced thus reducing the voltage on the emitter of the transistor 147 thus increasing the base to emitter voltage of such transistor 147 and rendering such transistor more conductive. Consequently, the voltage across the triggering resistor 155 will be increased sufficiently to apply a biasing voltage to the base of the amplifying transistor 159 to render such transistor conductive to increase the voltage drop across the triggering resistor 175 and potentiometer 177. As in the first stage, conduction through the amplifying transistor 159 increases the potential on the node 185 and consequently on the base of the second transistor 147 of the differential transistor pair thus locking such transistor full on to also lock the amplifying transistor 159 full on. The voltage drop across the resistor 175 and potentiometer 177 increases the voltage drop across the resistors 199 and 201 to thus increase the voltage on the base of the second stage driver transistor 195 to render such transistor conductive to thereby complete a circuit from the lead 131 through lead 191, coil of the relay 29 and through the collector to emitter circuit of driver transistor 195 to the lead 43. Consequently, the second stage switch 273 will be closed on the contact 281 to open the circuit to the low speed terminal 23 and complete the circuit to the mid-speed terminal 31.

If the temperature in the furnace plenum chamber still continues to rise thus increasing the temperature of the thermistor 13 thereby decreasing the resistance thereof, the current flow through the resistor 63 and third stage potentiometer 65 will continue to increase thus increasing the voltage drop thereacross thereby decreasing the voltage on the wiper 224 and consequently on the base of the third stage transistor 211 of the transistor pair to thus render the transistor 213 conductive and, consequently, the third stage amplifying transistor 231. As described hereinabove, the conduction through the emitter-collector circuit of the amplifying transistor 231 will lock the transistor 213 on and also render the third stage driver transistor 259 conductive thus energizing the third stage relay 209 to draw the third stage switch 289 from the terminal connected with the lead 275 to make contact with the terminal connected with the lead 295 leading to the high speed terminal 207.

When the furnace provides sufficient heat to the room of which the temperature is being controlled, the furnace will be shut off thus tending to cool the plenum chamber thereby cooling the thermistor 13. As the thermistor cools its resistance will be increased thus gradually decreasing the voltage drop across the first second and third stage potentiometers 67, 71 and 65 to thus sequentially raise the voltages on the bases of the respective third, second and first stage transistors 211, 145 and 15 thereby rendering such transistors more conductive thus sequentially raising the voltage on the respective emitters thereof and consequently raising the voltage on the emitters of the respective mating transistors 213, 147 and 77 of the respective pairs to thus sequentially render such transistors 213, 147 and 77 less conductive. It will be appreciated that the bases of the respective transistors 213, 147 and 77 are at a higher potential than that at which they were first triggered thus causing such transistors to remain conductive until the temperature of the thermistor 13 falls significantly below the temperature at which such transistors were rendered conductive. Consequently, the first stage transistor 77 will remain conductive until the temperature of the thermistor 13 falls to approximately 100°F. to thereby maintain the first stage driver transistor 19 conductive and the first stage relay 21 energized to maintain the blower motor 25 in operation until the furnace heating elements have cooled sufficiently to render blowing of air thereover relatively ineffective to continue forced air heating of the room.

If it should become desirable to operate the multispeed motor 25 independent of the subject control system the manual switch 301 may be actuated to complete a circuit between the terminals 303 and 307 to thus essentially short out the first stage driver transistor 19 thus energizing the first stage relay 21. Similarly, the switch 301 may be switched to complete a circuit from the terminals 307 and 313 to again energize such first stage relay 21 and also complete a circuit between the terminals 311 and 321 to thus energize the second stage relay 29 thereby energizing the mid-speed terminal 31 of the motor 25. If it becomes desirable to operate the motor 25 at high speeds, as in providing cooling air to the room of which the temperature is being controlled, the third stage manual switch 329 may be closed to short out the third stage driver transistor 259.

From the foregoing it will be apparent that the multispeed control system of the present invention provides an economical and highly reliable control system which is responsive to various temperatures to drive a blower at various speeds. It will be appreciated that the subject circuit is essentially insensitive to temperature changes incurred by the components thereof and that the control relays are connected in parallel with the triggering circuit thus eliminating any fluctuations that may be caused by such relays being energized and consequent false triggering of the control system.

Various modifications and changes may be made to the foregoing detailed description without departing from the spirit of the invention.

What is claimed is:

1. A multispeed control system for selecting the number of isolated windings for excitation in a multiwinding electrical motor in response to selected discrete amplitudes of a sensed parameter, comprising:

electrical power supply means for providing a D.C. electrical signal;

parameter responsive means disposed to respond to said sensed parameter in a predetermined relationship of electrical resistance corresponding to the amplitude of said sensed parameter;

a first and second resistive divider network connected in parallel for excitation across said power supply means and across said parameter responsive means as one element thereof;

a first and second differential amplifier respectively connected between said first and second divider networks and said parameter responsive means for respectively producing a first and second bridge differential signal in response to the corresponding bridge balance formed therebetween; and a first and second control circuit connected to respectively receive said first and second differential amplifier signal for selectively connecting for excitation said isolated windings of said motor in a predetermined response to said first and second bridge differential signals.

* * * * *